3,505,316
RECOVERY OF DIOSGENIN FROM DIOSCOREA ROOT MATERIAL
Paul Belter and Chong Y. Yoon, Kalamazoo, Mich., assignors to The Upjohn Company, Kalamazoo, Mich., a corporation of Delaware
No Drawing. Filed Feb. 26, 1968, Ser. No. 707,981
Int. Cl. C07c *173/06*
U.S. Cl. 260—239.55                    4 Claims

ABSTRACT OF THE DISCLOSURE

Diosgenin is recovered in high yield and improved quality from dioscorea root material by a process comprising consecutive steps of (1) acid treatment of the root material followed by (2) separation of the residual solid material from the acid fluid, and followed by (3) removal of water solubles from the residual solids thus to obtain a "brown powder." Diosgenin is then recovered from the brown powder. The improvement includes use of substantially higher concentrations of acid during (1) and a reuse recycle of a substantial portion of the acid filtrate produced at (2).

BACKGROUND OF THE INVENTION

A number of plant varieties produce tubers or roots which contain dioscin which, upon hydrolysis, yields diosgenin. Such plants are principally of the genus Dioscorea, and many diosgenin-producing species are well known to those skilled in the art. Although the species differ from each other in some characteristics, they possess the common property of producing tubers containing a substantial amount of dioscin which yields diosgenin upon hydrolysis. For the purpose of this specification, these tubers will be referred to as dioscorea roots.

Recovery of diosgenin from dioscorea roots by prior methods has involved a variety of processes, most of which include acid hydrolysis of the saponins to release the diosgenin as an integral step of its recovery. A number of methods have been described which include acid treatment or digestion of dioscorea root material.

The use of acid concentrations greater than 2 N at atmospheric pressures has been regarded by those skilled in the art as detrimental to yield and quality of diosgenin, as shown by the experiments of Rothrock et al., Ind. and Eng. Chem. 49, No. 2, pp. 186–8 (1957), in which article the quality impairment was found to be manifested by increased color and lowered melting point of diosgenin when acid stronger than 2 N was used. It has been suggested that this lowered quality is caused in part by acid dehydration resulting in 3:5-diene formation, which was found to occur even at the optimum conditions of Rothrock et al. See Peal, Chem. and Ind., Nov. 2, pp. 1451–2 (1957). The acid hydrolysis of a wide range of plant materials including dioscorea root is described in U.S. Patent 2,774,714, using a wide variety of organic and inorganic acids of from 2% to 50% concentration. The patentees, however, when treating dioscorea root material, use 2 N acid, consistent with the experimental results of Rothrock et al. and Peal.

U.S. Patent 3,019,220 describes a process similar to the above using a dilute aqueous hydrochloric acid digestion followed by extraction of the total hydrolysis mixture with a solvent such as trichloroethylene to remove the diosgenin. This prior art process is an asserted improvement on the above method in that the step of separating the hydrolyzed plant material by filtration is eliminated.

In these processes efficient removal of high quality diosgenin is not achieved. In the former process, this is caused by incomplete hydrolysis and consequent losses in the washing and other separation steps. In the latter it is caused by a still less complete hydrolysis and consequent losses in the extraction step.

BRIEF DESCRIPTION OF THE INVENTION

According to the present invention, dioscorea root material or vegetable organic matter comprising it as a principal ingredient which contains dioscin is given an acid treatment with 3 N sulfuric acid, or stronger, until all the dioscin and other diosgenin yielding saponins are hydrolyzed. Using atmospheric pressure and reflux temperatures, this action is complete within a period of about 4 hours. The solid material is then separated from the mixture, as by filtration, producing an acid filtrate.

The upper value of sulfuric acid concentration, in accordance with this invention is above about 5 N, at which the effect of prolonged exposure at boiling temperatures begins to break down significantly the diosgenin molecule, resulting in a more highly colored product of decreased quality. As will be understood by those skilled in the art, nonetheless, these higher acid concentrations can be employed successfully without yield or quality impairment by using lower temperatures and/or shorter hydrolysis times.

Further, according to the invention, the acid filtrate so produced after the acid treatment of the root material is then used as a recycle acid for treating an additional quantity of dioscorea root material.

The improvement of this invention provides a method whereby diosgenin can be produced in yield equal to or greater than prior available methods, yet at a significantly increased quality without increasing the amount or cost of materials consumed. The invention rests in part upon the discovery that the acid present in the acid filtrate is a suitable medium for producing a high-yielding, better quality diosgenin when mixed with an amount of fresh acid so as to require no more acid consumption than experienced in the prior art to produce crude diosgenin of high color and low melting point.

Since the process of this invention is applicable to the use of green dioscorea root or dry dioscorea root material, it will be apparent to those skilled in the art that the former introduces a considerable amount of water into the system thus requiring different bases for calculating the recycle acid. In each, the resulting acid environment at the start of the acid treatment should be at least 3 N. The following Examples 1 and 2 illustrate the two variations of using dry dioscorea root and green dioscorea root. Using the former we have discovered, as a general matter, a recycle of approximately 60% of the total filtrate together with sufficient concentrated sulfuric acid to result in at least a 3 N acid mixture after addition of the dry root will provide a stable recycle system hydrolyzing at least 90% of the diosgenin yielding saponins originally present. Using the latter, i.e., green root, no water is needed for the make-up acid because of the water in the root material as will be appreciated by those skilled in the art.

The improvement of this invention provides a solid, water-insoluble product consisting principally of plant fiber and diosgenin, suitable for extraction with a diosgenin solvent according to known methods, and recovery of diosgenin from the extract, also by known methods. Suitable diosgenin solvents are the petroleum ether solvents such as hexane or commercial mixtures of hexane hydrocarbons, heptane, and the like. A suitable method of recovery of diosgenin from the extract is by filtration (to separate undissolved material) and evaporation of the solvent from the filtrate.

The solid water-insoluble product previously referred to, when produced by a preferred embodiment of this invention using finely divided dioscorea root material, has the appearance of a brown powder when dried, and is analogous to the product known in the art as "brown powder."

The solid material separated from the acid treatment step is washed with water. The washed material is then neutralized, preferably just prior to the ensuing separation step. The solid material is removed from the mixture as by filtration, and can be dried if desired or it may be extracted in the form of wet cake with a diosgenin solvent at reflux temperatures. If wet cake is used directly, the residual water is preferably separated by azeotropic action during the initial stages of reflux. Diosgenin is recovered from the solvent after filtration of the solids by conventional methods.

According to a preferred embodiment of this invention, after filtration separation of the acid portion to be used for recycle, the remaining acid filter cake is reslurried in water to about its former volume before separation of the recycle acid, and is subjected to a second stage of heating for a period of 1 to 3 hours, whereupon the solid material is separated, washed and neutralized, and sent to diosgenin recovery as previously described. The second stage filtrate is discarded. This embodiment affords an upgrading in yield and quality of the diosgenin finally produced.

In the following examples the assays of diosgenin were carried out by gas-liquid chromatography technique, following conditions for the gas-liquid chromatography described by VandenHeuvel et al., Jour. Org. Chem. 26, 631 (1961).

The assay of all streams in the process was used to base the yields, because this method was considered more reliable than a simple comparison of assay of input root. The reason for this is the wide range of diosgenin content that occurs naturally in dioscorea roots and between crops from different seasons and areas of local production.

The following are examples of the process of this invention.

EXAMPLE 1

A suitable system of continuous operation can be iniated by starting with a sample of 100 grams of dry dioscorea root and treating it with 4 N sulfuric acid at about 96° C. under reflux temperatures for about 4 hours. A suitable quantity of acid is 300 ml. After the treatment period, the mixture is then cooled to room temperature and the solids are separated from the mixture, for example, by filtration, producing about 250 ml. filtrate. 150 ml. of the filtrate is then used as recycle acid and a stable series of extraction cycles can be established in which each batch of feed consists of 100 grams ground dioscorea root, and the acid material added to each feed batch consists of 150 ml. of recycle acid filtrate, and 150 ml. of 4 N sulfuric acid make-up.

This stables series of acid treatments produces a corresponding series of solid material products and a series of excess acid filtrates of approximately 100 ml. each, which latter can be neutralized and discarded. The solid material batches containing the diosgenin are washed with 600 ml. of water followed by a heating period of several hours, and the wash mixture neutralized with 25% sodium hydroxide solution. The neutralized washed mixture is then filtered and the solid material dried to a brown powder assaying a substantial quantitative yield based on the original content of the root material.

EXAMPLE 2

The process of Example 1 was followed except that green dioscorea root was used throughout so that the feed after stabilization consisted of 400 grams of ground green dioscorea root, 300 ml. of recycle acid and 38 ml. of concentrated sulfuric acid. The acid filtrate which, in this example, constitutes approximately 500 ml. is separated into a 300 ml. recycle portion and a 200 ml. portion which is neutralized and discarded. Treatment of the separated solid material is the same as in the preceding example.

EXAMPLE 3

A series of process comparison studies

The procedure of the initial stage of Example 1 was carried out in a series of batch treatments using the conditions given in Table I below. A different batch of dioscorea root was used for each group of experiments as they appear in the table. Diosgenin recovery is based on the amount of diosgenin found in all streams using gas-liquid chromatography. Isolated product yield is based on the dry weight of the dioscrea root.

TABLE I.—PROCESS COMPARISONS

| Experimental group | Sulfuric acid conc. | Temp., °C. | Time, hrs. | Isolated product yield, wt. percent | Diosgenin recovery, percent | Isolated product quality, percent |
|---|---|---|---|---|---|---|
| I | 3N | 94–95 | 4 | 3.3 | 90.0 | 94.4 |
|  | 4N | 94–95 | 4 | 3.8 | 93.0 | 91.5 |
|  | 4N | 94–95 | 4 | 3.5 | 94.0 | 89.2 |
| II | 3N | 94–95 | 4 | 5.0 | 81.0 | 88.7 |
|  | 4N | 94–95 | 4 | 5.5 | 94.5 | 94.7 |
|  |  |  |  |  | 94.0 | 92.0 |
| III | 4N | 94–95 | 4 | 5.7 | 95.2 | 93.3 |
| IV | 2N | 94–95 | 4 | 4.3 | 63.1 | 44.7 |
| V | 2N | 115 | 1 | 6.0 | 94.5 | 79.3 |
|  | 2N | 115 | 2 | 5.7 | 94.5 | 78.8 |
|  | 2N | 115 | 4 | 5.1 | 94.0 | 83.2 |

The experiments of Groups I, II and III are in accordance with the process of this invention, showing the use of sulfuric acid treatment at a concentration of at least 3 N. For comparison purposes, the experiments of Groups IV and V follow the recommendations of the art as discussed above, using 2 N sulfuric acid concentration.

EXAMPLE 4

A recycle series

This experiment illustrates the use of the acid filtrate as a recycle acid.

A series of treatments was carried out as in Example 1 using successive 100 g. charges of ground dried dioscorea root and the successive charges of acid shown below. The results are given in Table II below. As before, the diosgenin recovery in the isolated product is based on the amount of diosgenin recovered in all streams.

TABLE II.—ACID RECYCLE

| Series | Amt. of 4N $H_2SO_4$ used, mls. Makeup | Amt. of 4N $H_2SO_4$ used, mls. Recycle | Isolated product yield, percent | Diosgenin isolated product recovery, percent | Diosgenin quality, percent |
|---|---|---|---|---|---|
| 1 | 600 | 0 | 4.6 | 92.3 | 91.3 |
| 2 | 30 | 570 | 4.4 | 90.5 | 94.7 |
| 3 | 0 | 600 | 7.6 | 87.5 | 51.3 |
| 4 | 15 | 585 | 4.3 | 89.7 | 97.7 |
| 5 | 25 | 575 | 3.9 | 81.0 | 90.6 |
| 6 | 300 | 300 | 4.2 | 84.3 | 89.6 |
| 7 | 300 | 300 | 6.4 | >100.0 | 97.0 |
| 8 | 300 | 300 | 5.5 | 90.7 | 77.8 |
| 9 | 300 | 300 | 4.6 | 93.5 | 96.4 |
| 10 | 300 | 300 | 4.4 | 91.7 | 96.6 |
| 11 | 300 | 300 | 4.6 | 93.1 | 92.7 |
| 12 | 300 | 300 | 4.6 | 90.1 | 95.4 |
| 13 | 300 | 300 | 4.6 | 94.0 | 92.5 |
| 14 | 300 | 300 | 4.5 | 93.0 | 93.7 |
| 15 | 300 | 300 | 4.3 | 92.3 | 91.2 |

We claim:

1. In a process for the production and recovery of diosgenin from dioscorea root material which comprises the steps of (1) sulfuric acid hydrolysis of dioscorea root material, and (2) separation of the acid hydrolysis mixture into an acid filtrate and a solid material, followed successively by separation of water solubles from the latter and subsequent extraction of diosgenin from the resulting solids, the improvement comprising recycling at least half of the said acid filtrate to extract an additional quantity of dioscorea root material and adding sufficient make-up sulfuric acid to render the acidity of the resulting acid mixture 3 N to 5 N.

2. In a process for the production of a water-insoluble solid material comprising diosgenin from dioscorea root material which comprises treating comminuted dioscorea root material containing dioscin in acid for a period of time sufficient to hydrolyze the dioscin to diosgenin, and separating the resulting water-insoluble solid material comprising diosgenin, the improvement which comprises using as acid treatment medium 3 N to 5 N sulfuric acid.

3. The method of claim 2 wherein the acid treatment medium is comprised at least half of recycle acid from a preceding sulfuric acid treatment of dioscorea root material.

4. The method of claim 3 wherein the acid treated comminuted dioscorea root material is filtered to remove recycle acid, leaving a residual acid mixture comprising residual sulfuric acid and acid treated dioscorea root material, adding water to said residual acid mixture and subjecting it to an additional stage of hydrolysis prior to separation of said residual sulfuric acid.

References Cited

UNITED STATES PATENTS 2,895,953   7/1959   Wall _____ 260—210.5

ELBERT L. ROBERTS, Primary Examiner

E. G. LOVE, Assistant Examiner